(No Model.)
L. YAKEL & S. K. DUFF.
MANUFACTURE OF DRAWHEADS.
No. 260,343. Patented June 27, 1882.
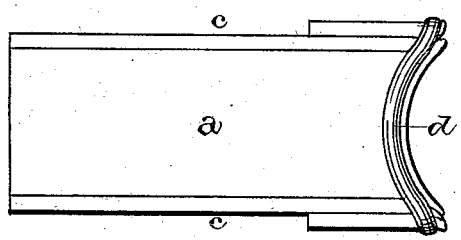
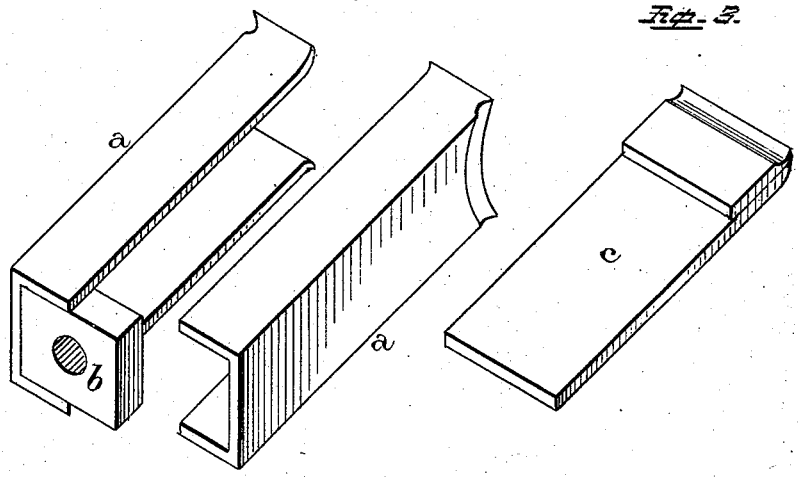
Witnesses.
W. W. Mortimer.
W. H. Kern.
Inventors.
Levi Yakel,
S. K. Duff,
per
F. A. Lehmann, atty.

UNITED STATES PATENT OFFICE.

LEVI YAKEL AND SAMUEL K. DUFF, OF ALLEGHENY, PENNSYLVANIA.

MANUFACTURE OF DRAW-HEADS.

SPECIFICATION forming part of Letters Patent No. 260,343, dated June 27, 1882.

Application filed February 11, 1882. (No model.)

*To all whom it may concern:*

Be it known that we, LEVI YAKEL and SAMUEL K. DUFF, citizens of the United States, residing at Allegheny, in the county of Allegheny and State of Pennsylvania, have invented certain new and useful Improvements in the Manufacture of Draw-Heads for Railway-Cars, of which the following is a specification, reference being had therein to the accompanying drawings.

Our invention relates to an improvement in the manufacture of draw-heads for railway-cars; and it consists in first forging and preparing the side, end, and re-enforcing pieces and the loop, then welding them together, and then compressing the article so made in a die and on a mandrel to impart to it the proper form.

Our object has been to make the draw-heads stronger without an increase of weight, and to enable them to effectually resist the concussions of the cars without sustaining injury therefrom, and this we accomplish by disposing of the material as hereinafter fully described.

The accompanying drawings represent our invention.

Figure 1 is a side elevation of our invention. Figs. 2 and 3 are perspectives of different parts.

The number of pieces of wrought-iron we employ is six, (6,) of which two (2) are channel-pieces, two (2) for re-enforcing the channel-pieces near the mouth of the draw-head, one (1) piece for the bottom, and one (1) piece encircling the nose of the draw-head.

We first weld the edges of the channel-pieces $a$ lengthwise together, then place the bottom or end piece, $b$, in the case formed by the channel-pieces, and then lay the pieces $c$ on top and bottom of the case to re-enforce the part that is to form the mouth of the draw-head. The forward ends of the channel-pieces and of the pieces $c$ have a groove for the reception of the piece $d$, which is placed therein and forms a solid rim around the mouth of the draw-head. When in this crude state a solid mandrel, of the reversed form that the inside of the draw-head is to have, is placed inside the forged and welded case and a die applied to the outside to determine the outer form. This being done while hot, the iron is forcibly compressed between the mandrel and the die by hammering or otherwise until all the pieces are firmly welded together and the draw-head has assumed the required form.

The form we give to the body of the draw-head is preferably four-cornered; but this may be changed without altering our mode of manufacturing.

By welding the channel-pieces lengthwise together the greatest tenacity of the fiber in the metal is made to encounter the greatest strain upon the draw-head, and being re-enforced near the mouth where the coupling-pin passes, and, furthermore, at its forward end by the piece $d$, surrounding its mouth, a degree of strength is imparted not attainable by the old method of manufacturing draw-heads for railway-cars.

Our draw-head, when finished, consists of a compact body of wrought-iron, without bolts, and of a form well calculated to withstand the severest concussions without injury.

We are aware that it is not new to make car and locomotive irons by welding a number of pieces together, and this we disclaim.

Having thus described our invention, we claim—

The improvement in the art of manufacturing draw-heads herein described — namely, forging and preparing the side pieces, $a$, end piece, $b$, re-enforcing-pieces $c$, and loop $d$, then welding these pieces together, and then compressing the article so made in a die and on a mandrel to impart to it proper form, substantially as set forth.

In testimony whereof we affix our signatures in presence of two witnesses.

LEVI YAKEL.
SAM. K. DUFF.

Witnesses:
JAMES BALPH,
WM. YAKEL.